(12) United States Patent
Aardenburg

(10) Patent No.: US 9,125,515 B2
(45) Date of Patent: Sep. 8, 2015

(54) PIERCING DEVICE, PARTICULARLY FOR CAPSULES FOR PREPARING BEVERAGES AND THE LIKE

(75) Inventor: Cornelis Aardenburg, Lugano (CH)

(73) Assignee: SWISS CAFFE ASIA LTD, Fo Tan, Shatin, N.T. (HK)

( * ) Notice: Subject to any disclaimer, the term of this patent is extended or adjusted under 35 U.S.C. 154(b) by 126 days.

(21) Appl. No.: 13/376,478

(22) PCT Filed: Jun. 9, 2010

(86) PCT No.: PCT/EP2010/058115
§ 371 (c)(1),
(2), (4) Date: Dec. 6, 2011

(87) PCT Pub. No.: WO2010/149496
PCT Pub. Date: Dec. 29, 2010

(65) Prior Publication Data
US 2012/0073418 A1    Mar. 29, 2012

(30) Foreign Application Priority Data
Jun. 24, 2009 (IT) .............................. MI2009A1118

(51) Int. Cl.
*B26F 1/00* (2006.01)
*A47J 31/06* (2006.01)
*A47J 31/36* (2006.01)

(52) U.S. Cl.
CPC ............ *A47J 31/0673* (2013.01); *A47J 31/369* (2013.01); *A47J 31/3628* (2013.01); *A47J 31/3695* (2013.01); *Y10T 83/9314* (2015.04)

(58) Field of Classification Search
CPC .... A47J 31/3614; A47J 31/42; A47J 31/0663
USPC ..................... 99/286, 289 R, 295, 302 R, 307
See application file for complete search history.

(56) References Cited

U.S. PATENT DOCUMENTS 4,136,202 A * 1/1979 Favre .............................. 426/77
5,826,492 A 10/1998 Fond et al.
(Continued)

FOREIGN PATENT DOCUMENTS

WO    WO 95/25457 A1    9/1995
WO    WO 2008/023057 A2    2/2008

OTHER PUBLICATIONS

International Search Report dated Sep. 27, 2010 issued in PCT/EP2010/058115.

*Primary Examiner* — Dana Ross
*Assistant Examiner* — Jimmy Chou
(74) *Attorney, Agent, or Firm* — Scully, Scott, Murphy & Presser, P.C.

(57) ABSTRACT

A piercing device, for capsules for preparing beverages, comprising a plate that can be associated with a capsule for infusions and at least one penetrator that protrudes at right angles from the plate toward the capsule and is provided with at least one external cutting edge for the penetration of at least part of the penetrator into the capsule as a consequence of the mutual approach of the plate and the capsule; passage duct is defined in the penetrator that terminates, at its ends, in a passage provided on the face of the plate that lies opposite the face provided with the penetrator, and at least one aperture provided in the part of the penetrator that can penetrate into the capsule for the passage of fluid from the face to the capsule or vice versa, the external cutting edge extending laterally to the penetrator along a helical profile.

9 Claims, 11 Drawing Sheets

(56) References Cited

U.S. PATENT DOCUMENTS

| | | |
|---|---|---|
| 2009/0199518 A1 | 8/2009 | Deuber et al. |
| 2009/0205503 A1* | 8/2009 | Cortese ........................... 99/295 |
| 2010/0037779 A1* | 2/2010 | Pecci et al. .................. 99/289 R |
| 2010/0064899 A1* | 3/2010 | Aardenburg .................... 99/295 |
| 2010/0239733 A1* | 9/2010 | Yoakim et al. ................ 426/431 |
| 2010/0313766 A1* | 12/2010 | Suggi Liverani et al. ...... 99/295 |
| 2012/0090473 A1* | 4/2012 | Deuber ....................... 99/289 R |

* cited by examiner

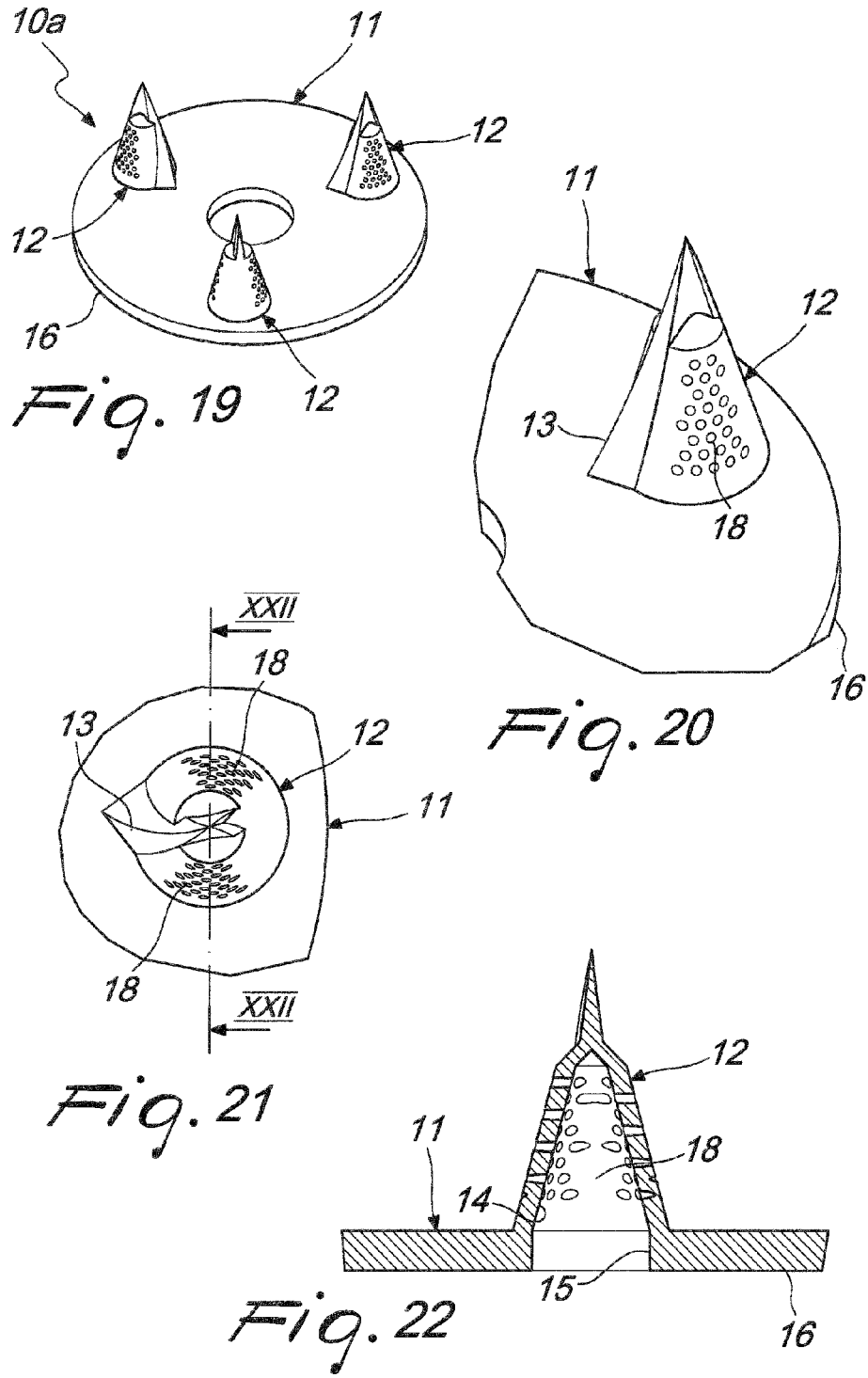

PIERCING DEVICE, PARTICULARLY FOR CAPSULES FOR PREPARING BEVERAGES AND THE LIKE

TECHNICAL FIELD

The present invention relates to a piercing device, particularly for capsules for preparing beverages and the like.

BACKGROUND ART

In machines for preparing coffee and infusions in general that work with capsules, piercing devices are known which are adapted to pierce a capsule that contains substances of various kinds in order to make hot water, cold water, a liquid, a fluid, a beverage and the like filter through said capsule, so as to obtain the desired infusion.

The piercing operation is therefore very important, since the holes for the inflow of the hot water and the exit holes of the infusion are formed during such operation.

More particularly, known types of piercing devices generally comprise an upper plate and a lower plate, which face each other and are provided, on their mutually facing faces, with wedges adapted to pierce the capsule.

For obtaining the infusion, the capsule is interposed between the two plates, which are subsequently moved, producing the relative approach of the two plates, by moving one or both.

In any case, with this movement the wedges of the two plates penetrate the capsule, piercing it and providing the entry and exit holes described earlier.

In order to optimize and speed up the infusion process, the wedges of the two plates define in their interior part of the channels for the passage of the hot water and of the infusion.

More precisely, the hot water, which arrives from an appropriately provided injection device, flows within the wedges of the upper plate and is injected into the capsule through adapted openings provided in the part of the wedge that has penetrated said capsule.

Likewise, the infusion generated by the filtration of hot water through the substances contained in the capsule is discharged through the wedges of the lower plate by means of adapted openings provided in the part of the wedge that has penetrated the pod and is discharged into an adapted discharge device, which is connected to an infusion collection element.

These known types of piercing devices are not devoid of drawbacks, which include the fact that the wedges with which the upper and lower plates are provided are not always able to penetrate the capsule correctly, causing fraying and/or penetrations and therefore producing unwanted leaks of water and/or infusion.

In order to obviate this drawback, it is known to provide the wedges with flat fins that form cutting edges adapted to facilitate the penetration of the wedges into the capsule, allowing the correct operation of the machine.

Nonetheless, with known types of piercing devices, even if they are provided with wedges that have flat cutting fins, the risk of piercing the capsule incorrectly, causing the leaks cited above, is high.

DISCLOSURE OF THE INVENTION

The aim of the present invention is to provide a piercing device, particularly for capsules for preparing beverages and the like, that solves the drawbacks of the background art.

This aim, as well as these and other objects that will become better apparent hereinafter, are achieved by a piercing device, particularly for capsules for preparing beverages and the like, comprising a plate that can be associated with a capsule and at least one penetrator that protrudes substantially at right angles from said plate toward said capsule and is provided with at least one external cutting edge for the penetration of at least part of said at least one penetrator in said capsule as a consequence of the mutual approach of said plate and said capsule, in said at least one penetrator a passage duct being defined that ends, at its ends, in a passage hole defined on the face of said plate that lies opposite the face provided with said at least one penetrator, and at least one aperture defined in the part of said at least one penetrator that can penetrate into said capsule for the passage of fluid from said face to said capsule or vice versa, characterized in that said external cutting edge extends laterally with respect to said at least one penetrator along a helical profile.

BRIEF DESCRIPTION OF THE DRAWINGS

Further characteristics and advantages of the present invention will become apparent from the description of preferred but not exclusive embodiments of a piercing device particularly for capsules for preparing beverages and the like, according to the invention, illustrated by way of non-limiting example in the accompanying drawings, wherein:

FIG. 19 is a perspective view of a second embodiment of the piercing device according to the invention;

FIG. 20 is an enlarged-scale view of a detail of the piercing device shown in FIG. 19;

FIG. 21 is an enlarged-scale plan view of a detail of the piercing device shown in FIG. 19;

FIG. 22 is a sectional view of the piercing device shown in FIG. 21, taken along the line XXII-XXII;

WAYS OF CARRYING OUT THE INVENTION

Figure 1:
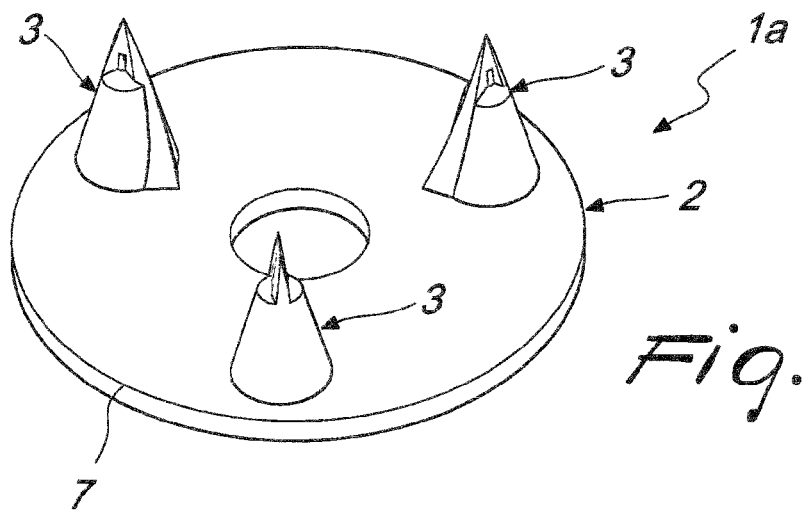
FIG. 1 is a perspective view of a first embodiment of a piercing device according to the invention.
Figure 2:
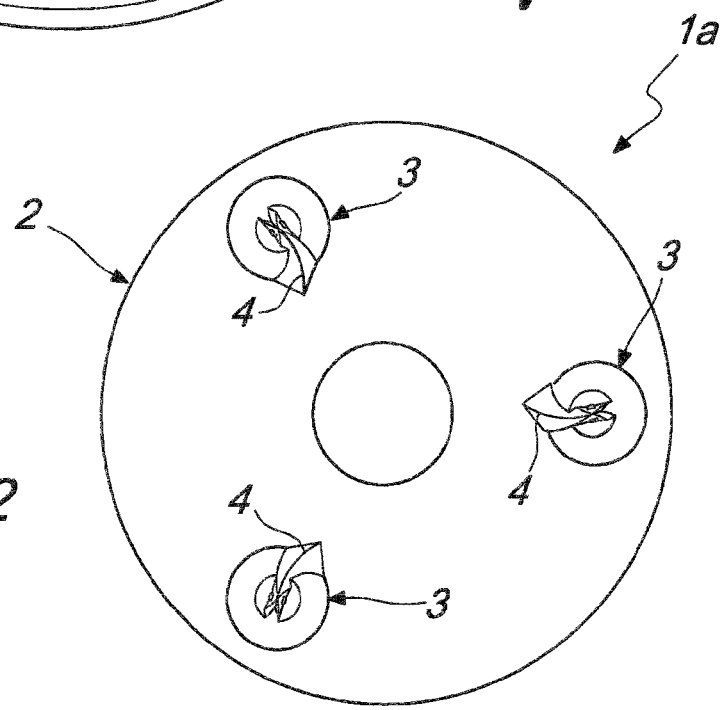
FIG. 2 is a plan view of the piercing device shown in FIG. 1.
Figure 3:
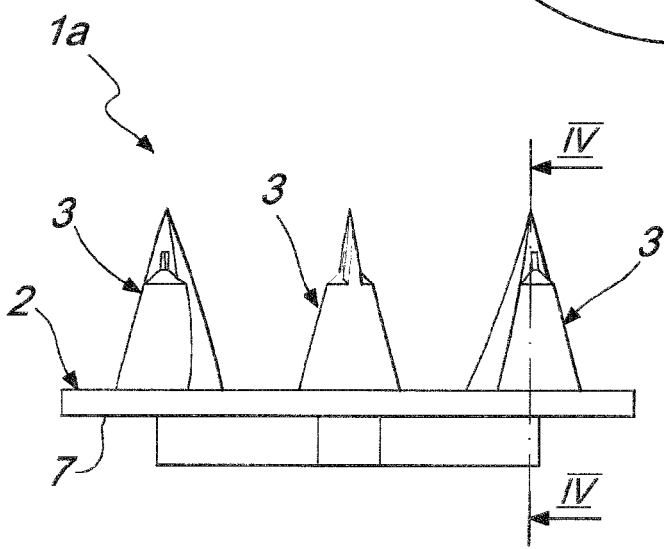
FIG. 3 is a side elevation view of the piercing device shown in FIG. 1.
Figure 4:
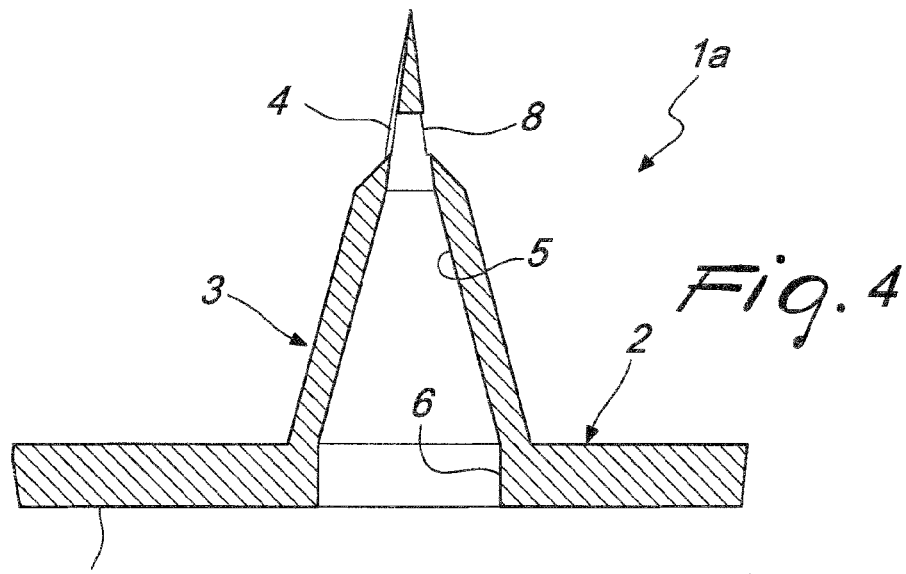
FIG. 4 is a sectional view of the piercing device shown in FIG. 1, taken along the line IV-IV.
Figure 5:
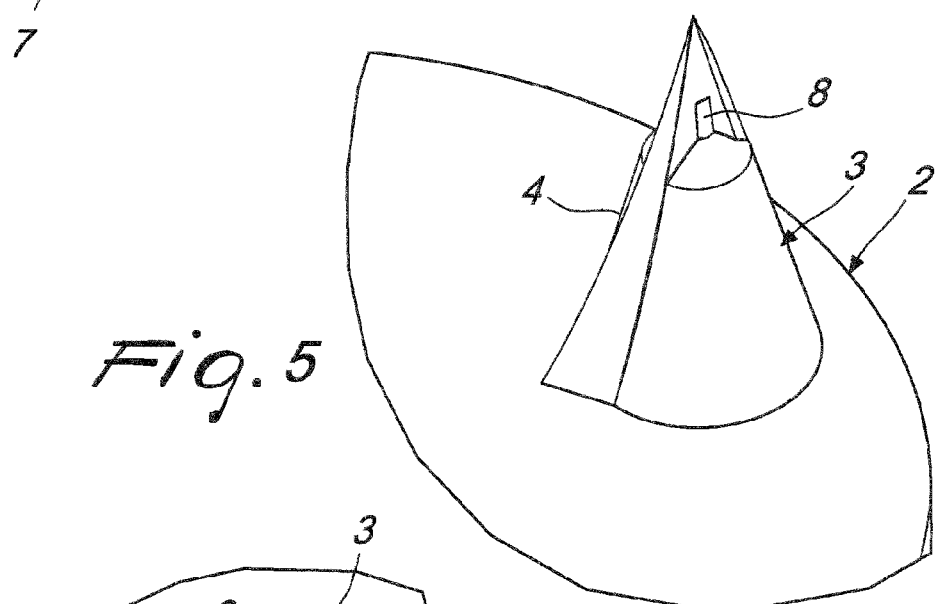
FIG. 5 is an enlarged-scale view of a detail of the piercing device shown in FIG. 1.
Figure 6:
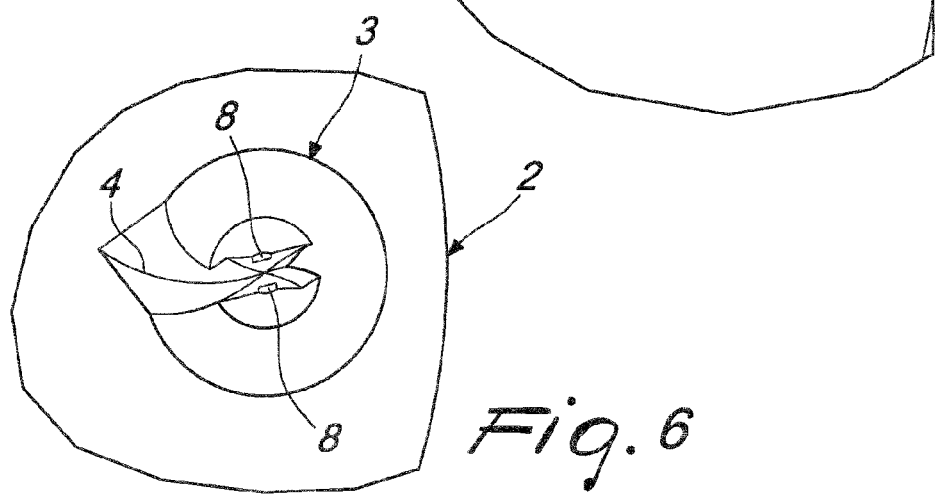
FIG. 6 is an enlarged-scale view of a detail of the piercing device shown in FIG. 2.
Figure 7:
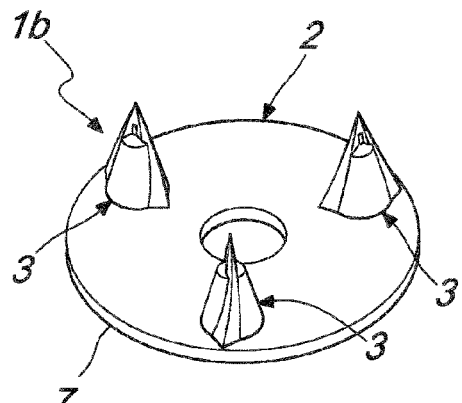
FIG. 7 is a perspective view of a variation of the first embodiment of the piercing device according to the invention.
Figure 8:
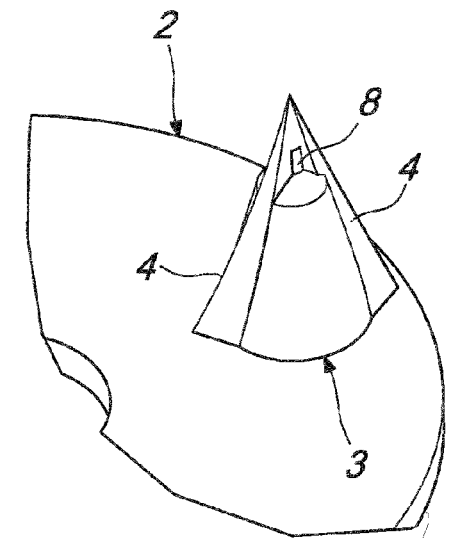
FIG. 8 is an enlarged-scale view of a detail of the piercing device shown in FIG. 7.
Figure 9:
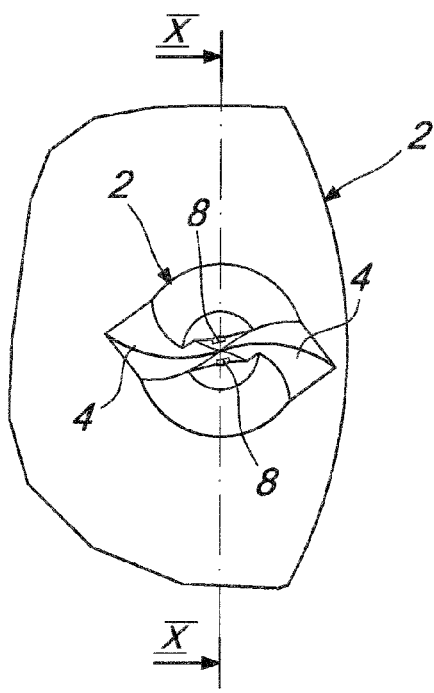
FIG. 9 is an enlarged-scale detail plan view of the piercing device shown in FIG. 7.
Figure 10:
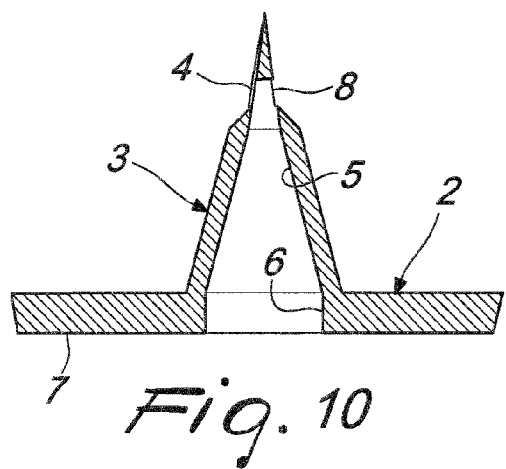
FIG. 10 is a sectional view of the piercing device shown in FIG. 9, taken along the line X-X.
Figure 11:
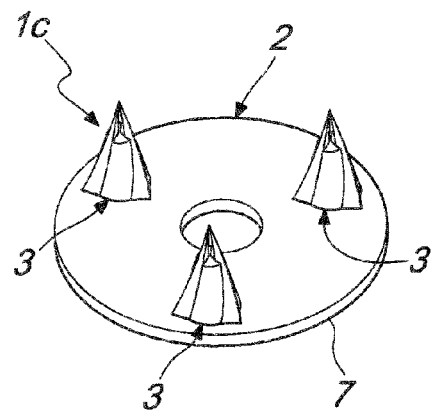
FIG. 11 is a perspective view of a further variation of the first embodiment of the piercing device according to the invention.
Figure 12:
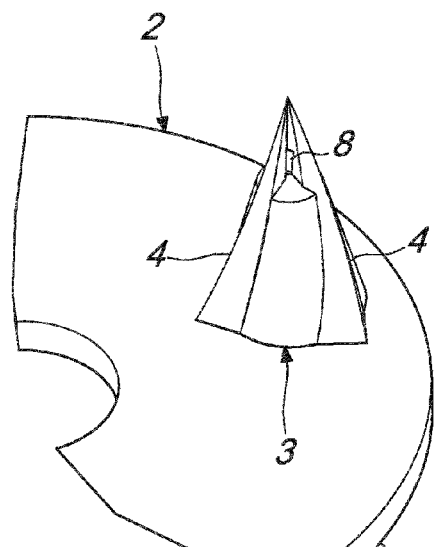
FIG. 12 is an enlarged-scale view of a detail of the piercing device shown in FIG. 11.
Figure 13:
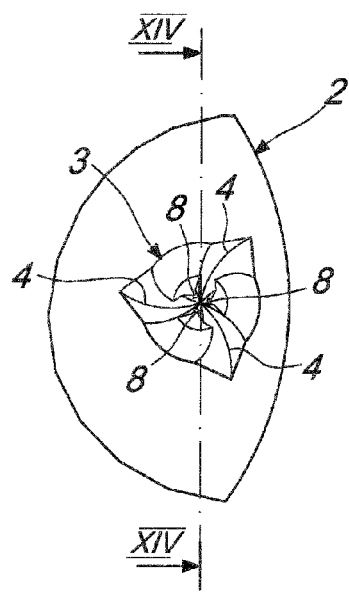
FIG. 13 is an enlarged-scale plan view of a detail of the piercing device shown in FIG. 11.
Figure 14:
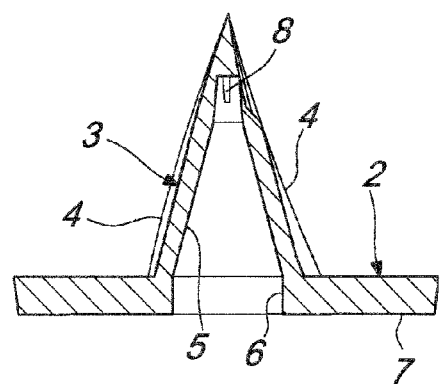
FIG. 14 is a sectional view of the piercing device shown in FIG. 13, taken along the line XIV-XIV.
Figure 15:
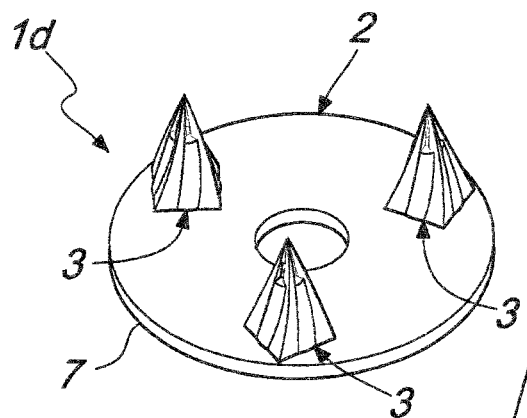
FIG. 15 is a perspective view of a still further variation of the first embodiment of the piercing device according to the invention.
Figure 16:
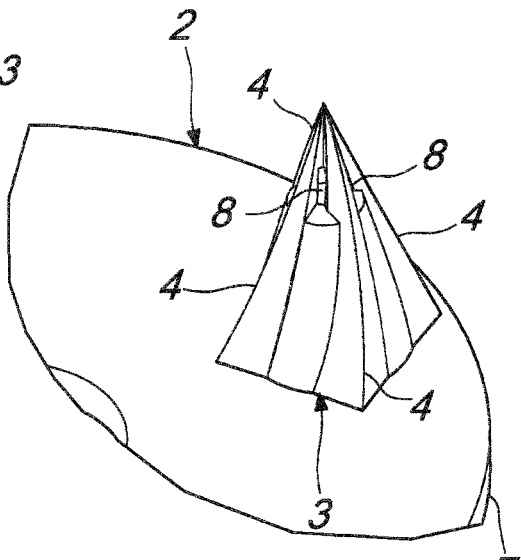
FIG. 16 is an enlarged-scale view of a detail of the piercing device shown in FIG. 15.
Figure 17:
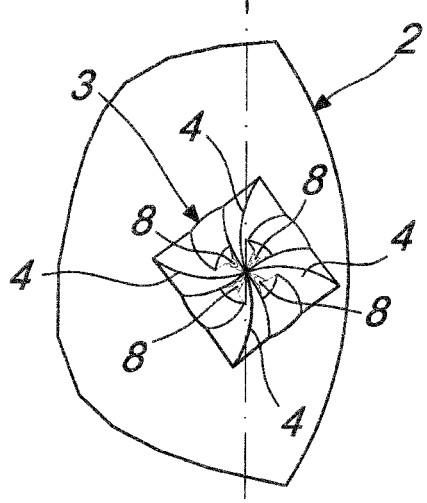
FIG. 17 is an enlarged-scale plan view of a detail of the piercing device shown in FIG. 15.
Figure 18:
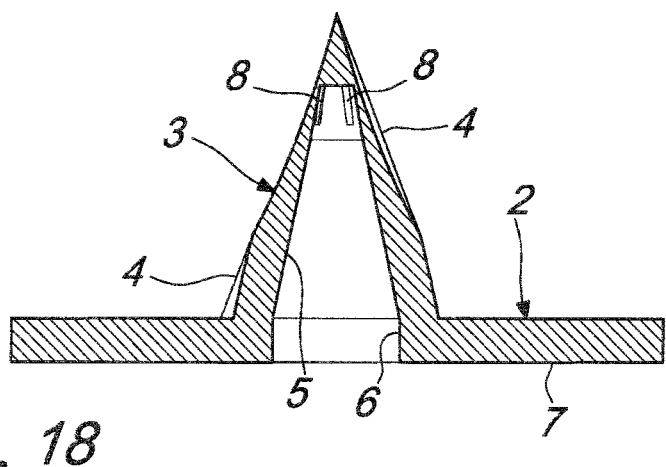
FIG. 18 is a sectional view of the piercing device shown in FIG. 17, taken along the line XVIII-XVIII.
Figure 23:
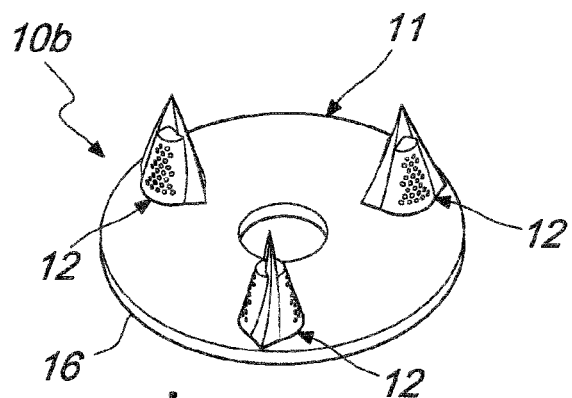
FIG. 23 is a perspective view of a variation of the second embodiment of the piercing device according to the invention.
Figure 24:
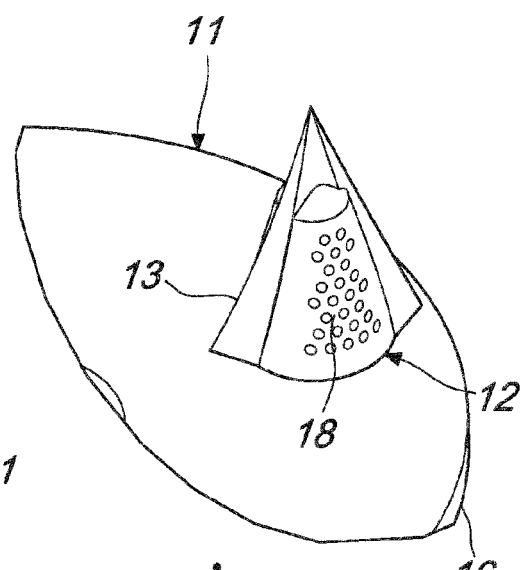
FIG. 24 is an enlarged-scale view of a detail of the piercing device shown in FIG. 23.
Figure 25:
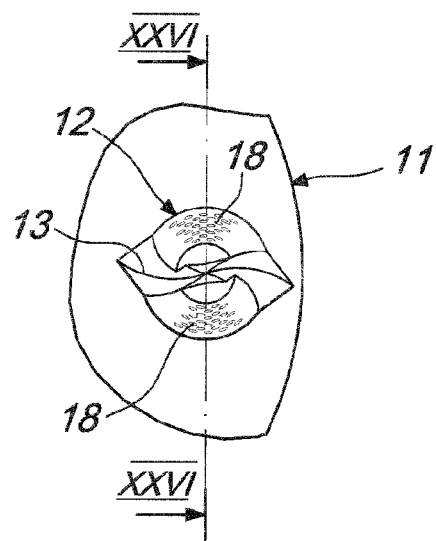
FIG. 25 is an enlarged-scale plan view of a detail of the piercing device shown in FIG. 23.
Figure 26:
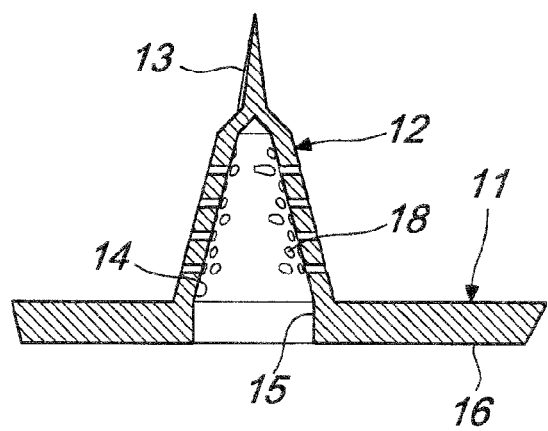
FIG. 26 is a sectional view of the piercing device shown in FIG. 25, taken along the line XXVI-XXVI.
Figure 27:
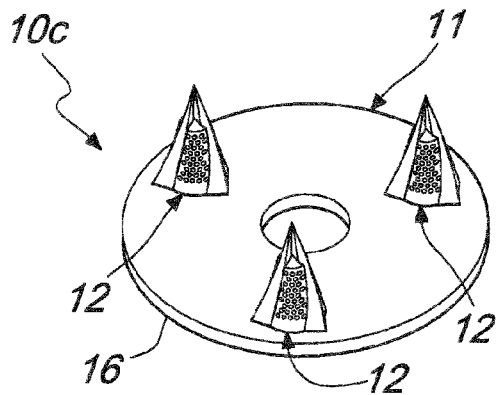
FIG. 27 is a perspective view of a further variation of the second embodiment of the piercing device according to the invention.
Figure 28:
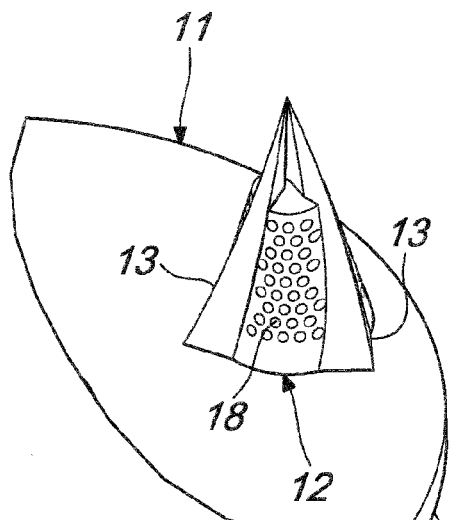
FIG. 28 is an enlarged-scale view of a detail of the piercing device shown in FIG. 27.
Figure 29:
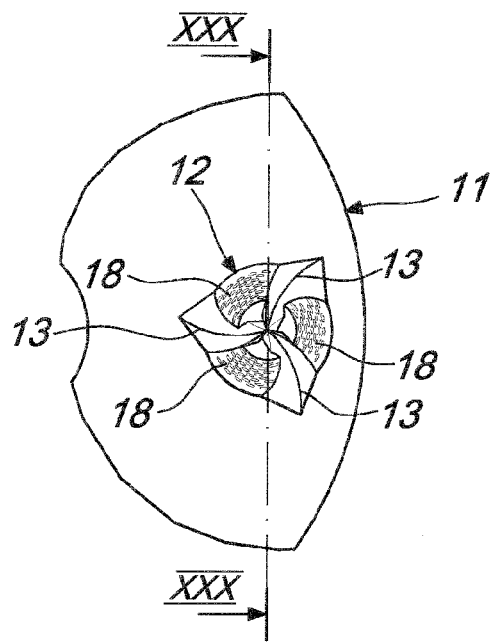
FIG. 29 is an enlarged-scale plan view of a detail of the piercing device shown in FIG. 27.
Figure 30:
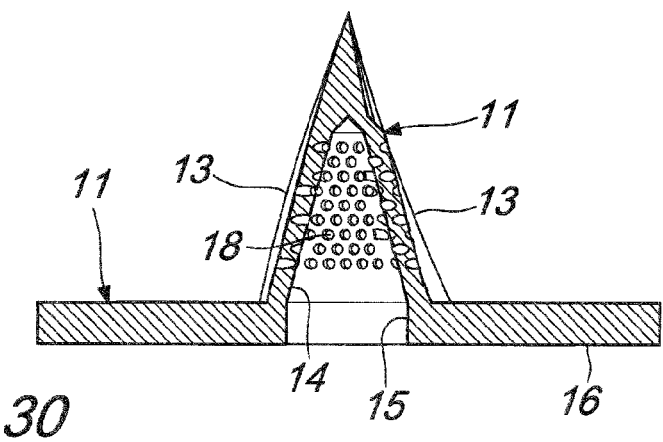
FIG. 30 is a sectional view of the piercing device shown in FIG. 29, taken along the line XXX-XXX.
Figure 31:
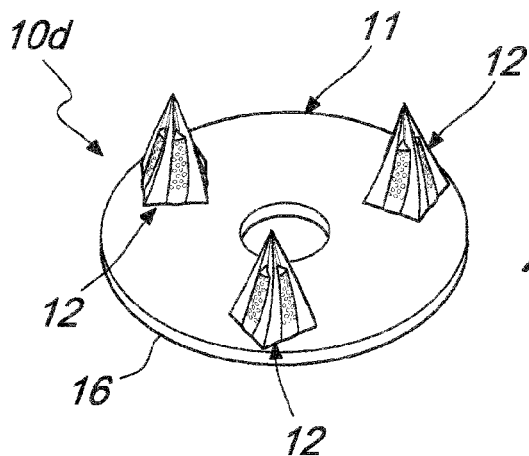
FIG. 31 is a perspective view of a still further variation of the second embodiment of the piercing device according to the invention.
Figure 33:
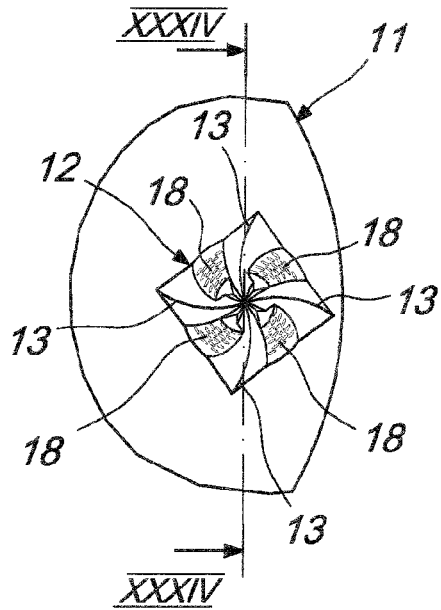
FIG. 33 is an enlarged-scale plan view of a detail of the piercing device shown in FIG. 31.
Figure 32:
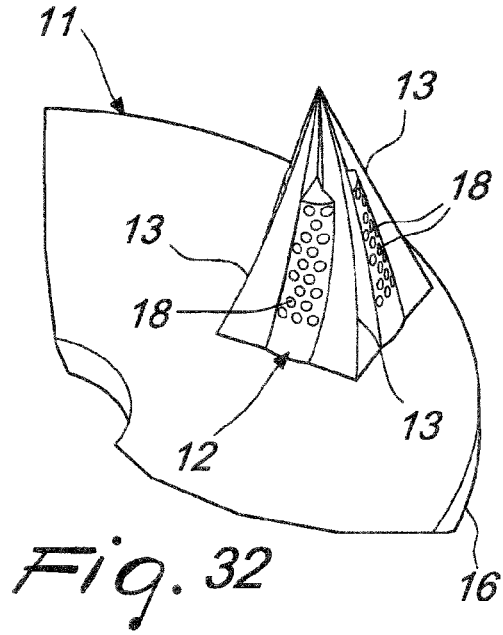
FIG. 32 is an enlarged-scale view of a detail of the piercing device shown in FIG. 31.
Figure 34:
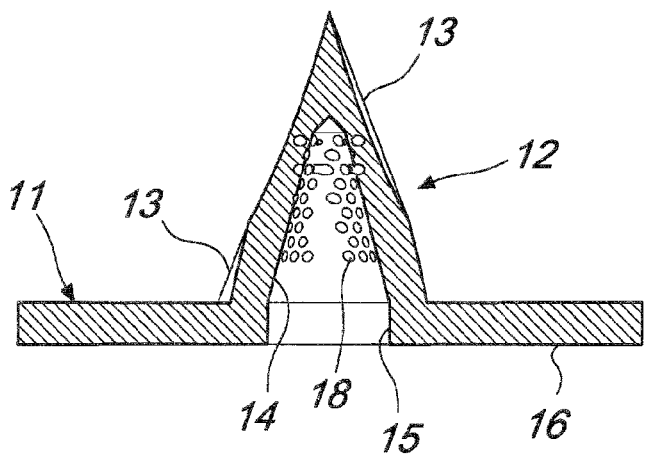
FIG. 34 is a sectional view of the piercing device shown in FIG. 33, taken along the line XXXIV-XXXIV.

With reference to the FIGS. 1 to 18 and 37, the first embodiment of the piercing device, particularly for capsules for preparing beverages and the like, generally designated by the reference numerals 1a, 1b, 1c and 1d in the four proposed variations of the first embodiment, comprises a plate 2 which can be associated at one end with a capsule 100 of infusions and the like and at the her end with a device for injecting hot water in order to let the hot water filter into the capsule 100 and obtain the infusion.

On the plate 2 a plurality penetrators 3, or at least one of them, are provided, extending substantially at right angles from the plate 2 in the direction of the capsule 100 and provided with a plurality of external cutting edges 4, or at least one of them, for the penetration of at least part of the corresponding penetrator 3 into the capsule 100 after the mutual approach of the plate 2 and said capsule 100.

More particularly, the penetrators 3, which as shown can vary in number from a minimum of one to a maximum of for example four, have a substantially conical, frustum-shaped or pyramid-like shape and are arranged by way of example along a circumference.

According to the invention, each external cutting edge 4 lies laterally to the corresponding penetrator 3 along a helical profile that starts from the tip of the penetrator 3 and extends to the base of the plate 2.

Advantageously, in each penetrator 3 there is a passage duct 5, which terminates, at its ends, in a passage hole 6 that is formed on the face 7 of the plate 2 that lies opposite the one provided with the penetrators 3 and a plurality of slots 8, or at least one of them, arranged between one external cutting edge 4 and the other and defined on the part of the penetrators 3 that can penetrate the capsule 100 for the passage of fluid (hot water, cold water, beverage, liquid, infusion and the like) from the face 7 to the capsule 100.

With reference to FIGS. 19 to 34 and 37, the second embodiment of the piercing device, particularly for capsules for infusions and the like, generally designated by the reference numerals 10a, 10b, 10c and 10d in the four proposed variants, comprises a plate 11 which can be associated at one end with a capsule 100 for infusions and the like and at the other end with a device for discharging the infusion obtained from the filtration of hot water into the capsule 100.

On the plate 11, similarly to the plate 2, a plurality of penetrators 12, or at least one of them, are provided, which protrudes substantially at right angles to the plate 11 in the direction of the capsule 100 and is provided with a plurality of external cutting edges 13, or with at least one of them, for the penetration of at least part of the corresponding penetrator 12 into the capsule 100 after the mutual approach of the plate 12 and the capsule 100.

More particularly, the penetrators 12, which as shown can vary in number from a minimum of one to a maximum of for example four, have a substantially conical, frustum-like or pyramid-like shape and are arranged, by way of example, along a circumference.

According to the invention, each external cutting edge 13 extends laterally with respect to the corresponding penetrator 12 along a helical profile that starts from the tip of the penetrator 12 and extends to the base of the plate 11.

Advantageously, in each penetrator 12 a passage duct 14 is defined that terminates, at its ends, in a passage hole 15 provided on the face 16 of the plate 11 that lies opposite the face provided with the penetrators 12 and a plurality of apertures 18, or at least one of them, arranged between one external cutting edge 13 and the other and defined on the part of the penetrators 12 that can penetrate the capsule 100 for the passage of fluid (hot water, cold water, beverage, liquid, infusion and the like) from the capsule 100 to the face 16.

Conveniently, for improving the delivery of the infusion into the discharge device through the passage duct 14, each penetrator 12 has finely perforated lateral surfaces 18.

Figure 35:
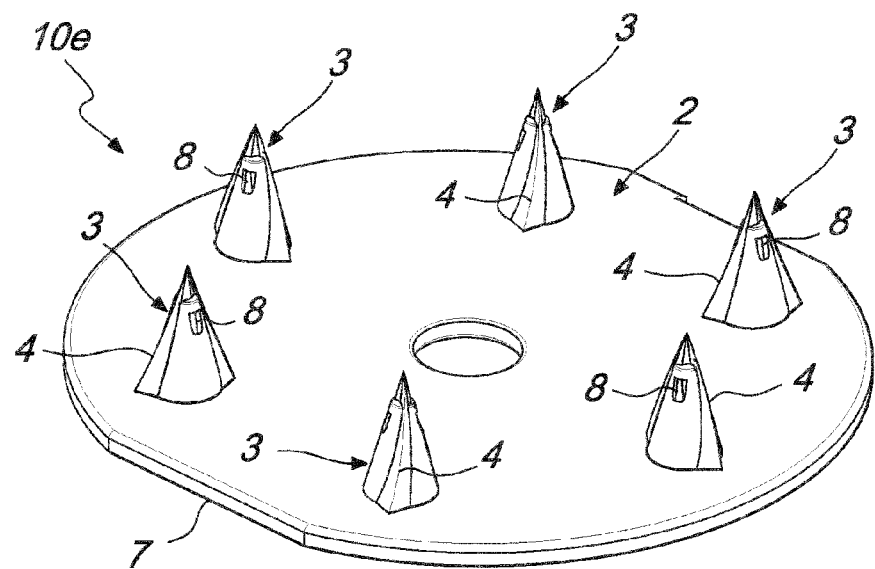
FIG. 35 is a perspective view of a third embodiment of the piercing device according to the present invention.
Figure 36:
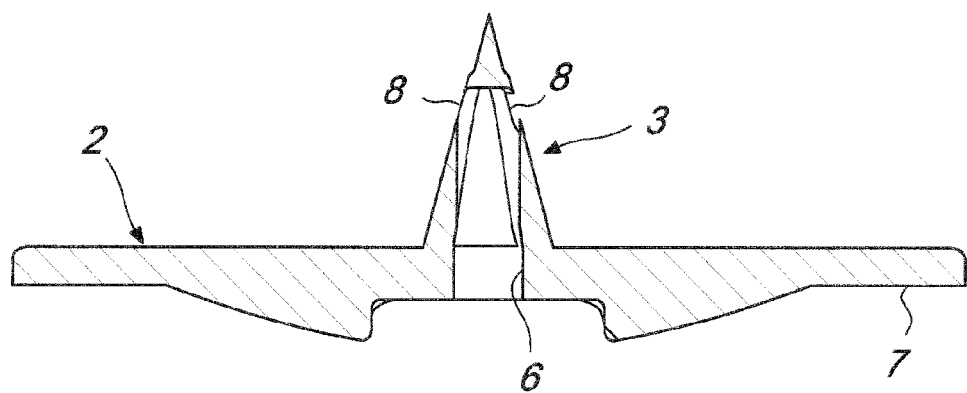
FIG. 36 is a sectional view of the piercing device of FIG. 35.
Figure 37:
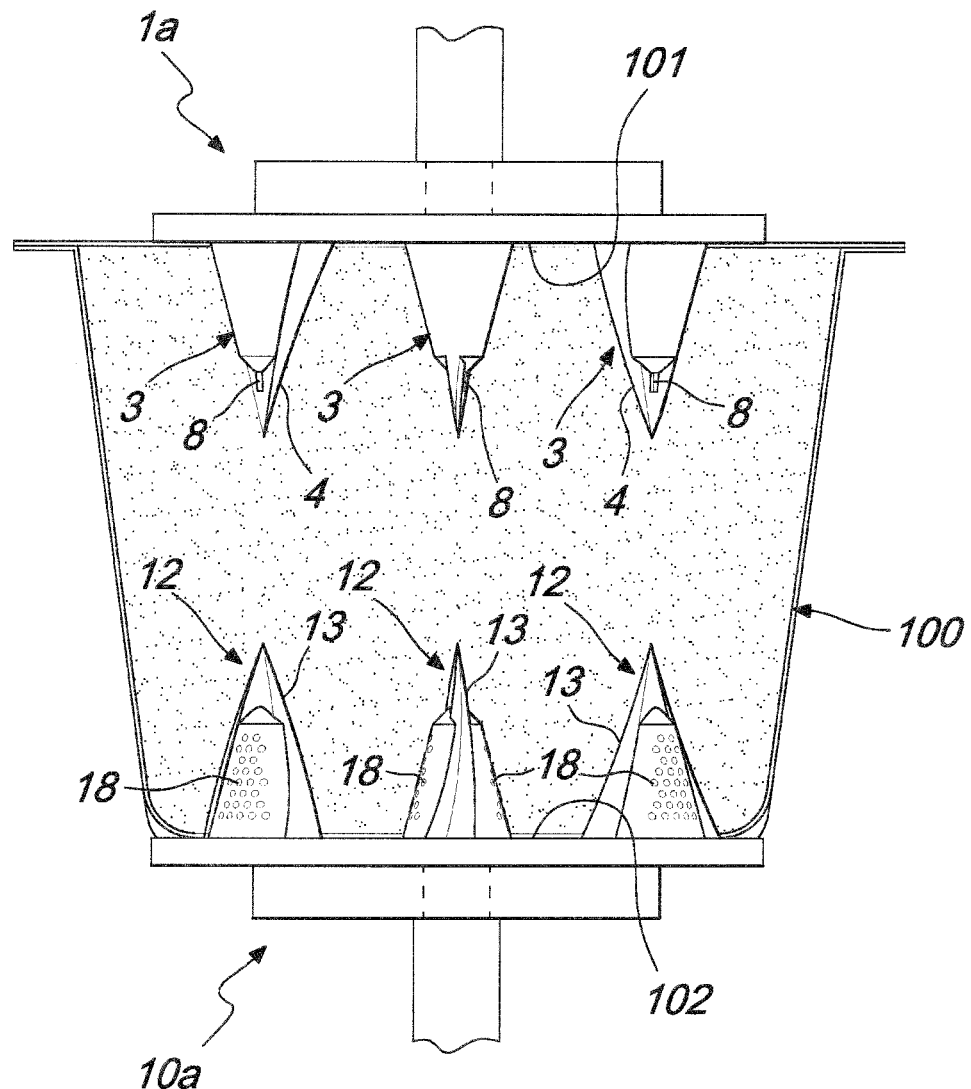
FIG. 37 is a schematic sectional view of two piercing devices according to the invention applied to a capsule.

FIGS. 35 and 36 show a third embodiment of the device according to the invention, in which the apertures 18 are arranged on the lateral surface of the penetrators 12.

Operation of the piercing devices according to the invention is clear and evident from what has been described.

More precisely, during the relative approach of the two plates 2 and 11, the penetrators 3 and 12, thanks to the presence of the external cutting edges 4 and 13 having a helical profile, pierce and penetrate without any problems the capsule 100 that is interposed between the two plates 2 and 11 respectively at the upper and lower surfaces 101 and 102 of the capsule 100.

One penetration from both surfaces 101 and 102 of the capsule 100 has occurred, hot water is introduced by the injection device into the capsule 100 through the passage channels 5 and the apertures 8.

The hot water flows through the substances contained in the capsule 100, generating the infusion, which is discharged through the apertures 18 and the passage channels 14 into the discharge device.

Advantageously, the part of the infusion that has accumulated on the bottom of the capsule 100 below the apertures 18 is further discharged through the finely perforated lateral surfaces 18 with which the penetrators 12 are provided.

In practice it has been found that the piercing device, particularly for capsules for infusions and the like, according to the present invention, fully achieves the intended aim and objects, since it makes it possible to pierce correctly the capsule that contains the substances through which the hot water is to be filtered, avoiding the formation of leaks of water and of infusion.

The piercing device, particularly for capsules for infusions and the like, thus conceived is susceptible of numerous modifications and variations, all of which are within the scope of the inventive concept.

All the details may further be replaced with other technically equivalent elements.

In practice, the materials used, as long as they are compatible with the specific use, as well as the contingent shapes and dimensions, may be any according to requirements and to the state of the art.

The disclosures in Italian Patent Application No. MI2009A001118 from this application claims priority are incorporated herein by reference.

The invention claimed is:

1. A piercing device for capsules for preparing beverages and the like, comprising:
    a plate that can be associated with a capsule, said plate having a top surface and an opposite bottom surface; and
    at least one penetrator that protrudes substantially at right angles from said top surface of said plate toward said capsule,
    wherein the at least one penetrator comprises:
    a tip,
    at least one external cutting edge for the penetration of at least part of said at least one penetrator into said capsule as a consequence of the mutual approach of said plate and said capsule,
    a passage duct defined in said at least one penetrator, wherein the passage duct terminates at a passage hole defined on the bottom surface of said plate, and
    at least one aperture defined in the part of said at least one penetrator that can penetrate said capsule for the passage of fluid from said bottom surface to said capsule or vice versa,
    wherein said at least one external cutting edge extends laterally with respect to said at least one penetrator and wherein said at least one external cutting edge has a helical profile extending from the tip of the penetrator to the top surface of the plate.

2. The device according to claim 1, further comprising a plurality of said penetrators that protrude at right angles from said plate in the direction of said capsule and are arranged along a circumference, each of said penetrators being provided with at least one external cutting edge that extends laterally with respect to said at least one penetrator along a helical profile.

3. The device according to claim 1, further comprising for each one of said penetrators, a plurality of external cutting edges that extend laterally with respect to said penetrator along a helical profile.

4. The device according to claim 1, wherein said penetrators have a substantially conical, frustum-like or pyramid-like shape.

5. The device according to claim 1, wherein said plate can be associated with a device for injecting hot water for filtering said hot water into said capsule and for obtaining the infusion.

6. The device according to claim 1, further comprising, for each one of said penetrators, a plurality of said apertures defined at the end of said passage duct proximate to the tip of said penetrator for the injection of said hot water into said capsule through said passage duct, each one of said apertures being arranged between one or more of said external cutting edges.

7. The device according to claim 1, wherein said plate can be associated with a device for discharging an infusion obtained from the filtration of hot water into said capsule.

8. The device according to claim 7, further comprising, for each one of said penetrators, a plurality of said apertures formed at the end of said passage duct proximate to the tip of said penetrator for the discharge of said infusion into said device for discharging through said passage duct, each one of said apertures being arranged between one or more of said external cutting edges.

9. The device according to claim 7, wherein said penetrators are provided with finely perforated lateral surfaces for the discharge of said infusion into said device for discharging through said passage duct and terminating in the passage hole.

* * * * *